United States Patent

[11] 3,603,139

[72] Inventor Shuh-Pan Ying
 Ann Arbor, Mich.
[21] Appl. No. 728,686
[22] Filed May 13, 1968
[45] Patented Sept. 7, 1971
[73] Assignee The United States of America as
 represented by the United States Atomic
 Energy Commision

[54] PULSED ACOUSTIC IMAGE CONVERTER
 12 Claims, 5 Drawing Figs.
[52] U.S. Cl................................................... 73/67.9,
 340/3 R, 340/5 MP
[51] Int. Cl...................................................... G01n 29/00
[50] Field of Search........................................... 73/67.5-67.9;
 315/12, 55; 340/5; 178/6; 310/8.3

[56] References Cited
 UNITED STATES PATENTS
3,213,675 10/1965 Goldman........................ 73/67.5

3,236,944 2/1966 Jacobs........................... 178/6.8

Primary Examiner—Richard C. Queisser
Assistant Examiner—Arthur E. Korkosz
Attorney—Roland A. Anderson ABSTRACT: An acoustic image converter comprises an acoustic image tube including a piezoelectric member and an electron gun structure capable of directing an electron beam over a surface of the piezoelectric member. Means provide a pulsed electric field across the piezoelectric member to transmit pulsed ultrasound therefrom to the object, the object reflecting a portion of the transmitted pulsed ultrasound back to the piezoelectric member to create a charge distribution thereon. The electron beam impinging upon the piezoelectric member releases therefrom secondary electrons having energies responsive to the charge distribution on the piezoelectric member. A collector electrode detects the secondary electrons and modulates the intensity of the display of a cathode-ray tube whose sweep is synchronized with the electron beam scan of the acoustic image tube.

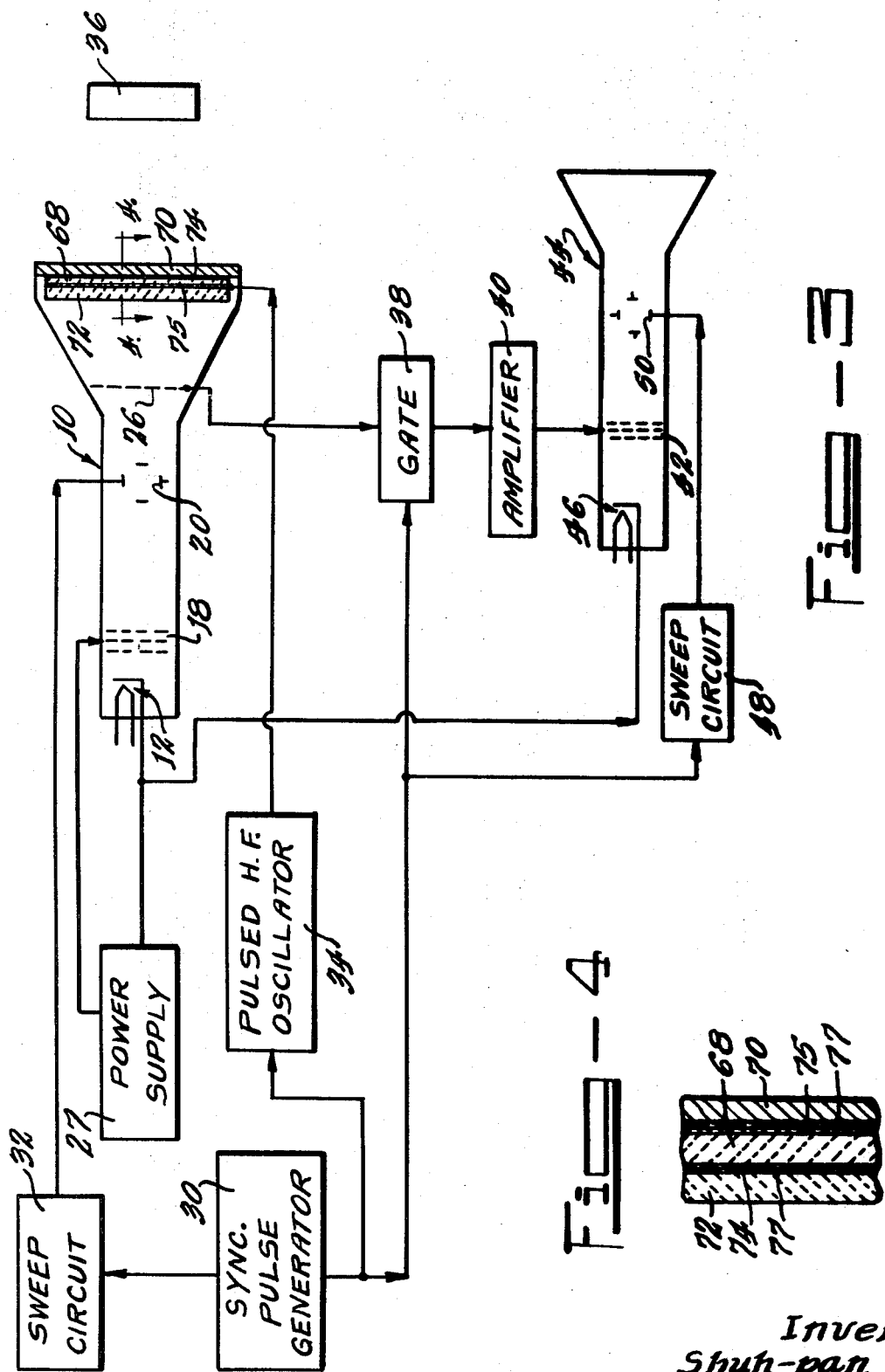

PULSED ACOUSTIC IMAGE CONVERTER

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to devices for displaying the image of a test object and more particularly to electronic acoustic image converters. In the conventional acoustic image converter, a transducer generates a continuous beam of plane ultrasonic waves so that the waves are incident on an examined object located in a liquid medium. Due to the reflection and absorption by the test object of the ultrasound, an acoustic shadow of the object is formed beyond it. An acoustic image converter tube located beyond the object converts the acoustic shadow into a series of electrical signals which are displayed on cathode-ray tube as an image of the test object.

It is one object of the present invention to provide an acoustic image converter operable from one side of a test object.

It is another object of the present invention to provide an acoustic image converter wherein the acoustic image converter tube acts as a transmitter and receiver.

It is another object of the present invention to provide an acoustic image converter operable responsive to ultrasound reflections from a test object.

It is another object of the present invention to provide a pulsed acoustic image converter.

Other details of the present invention will become apparent as the detailed description proceeds.

SUMMARY OF THE INVENTION

In general, the acoustic image converter of the present invention comprises a piezoelectric member, means for exciting the piezoelectric member to transmit therefrom pulsed ultrasound to a test object which reflects a portion of the pulsed ultrasound back to the piezoelectric member to create a charge distribution thereacross, and means for measuring the charge distribution of the piezoelectric member to provide an image of the object.

BRIEF DESCRIPTION OF THE DRAWINGS

Further understanding of the present invention will best be obtained from consideration of the accompanying drawings wherein:

FIG. 3 is a schematic diagram of the preferred apparatus constructed according to the present invention.

FIG. 4 is a magnified portion of the apparatus of FIG. 3 taken along line 4—4.

FIG. 5 is a schematic diagram showing the addition of a reflector to the apparatus of FIGS. 1, 2 and 3.

In FIG. 1, an acoustic image-transceiving converter tube 10 includes an electron gun 12 having a heater 14, cathode 16 and grids 18. Four beam deflection plates 20 are disposed within the tube 10 and a piezoelectric plate 22 having an electrically conductive thin metal coating 23 on one side thereof is mounted to the acoustic window 24 of the tube 10. Silicone grease acoustically couples the window 24 and the piezoelectric plate 22. A collector electrode 26 is mounted between the deflection electrodes 20 and the piezoelectric plate 22.

Figure 1:
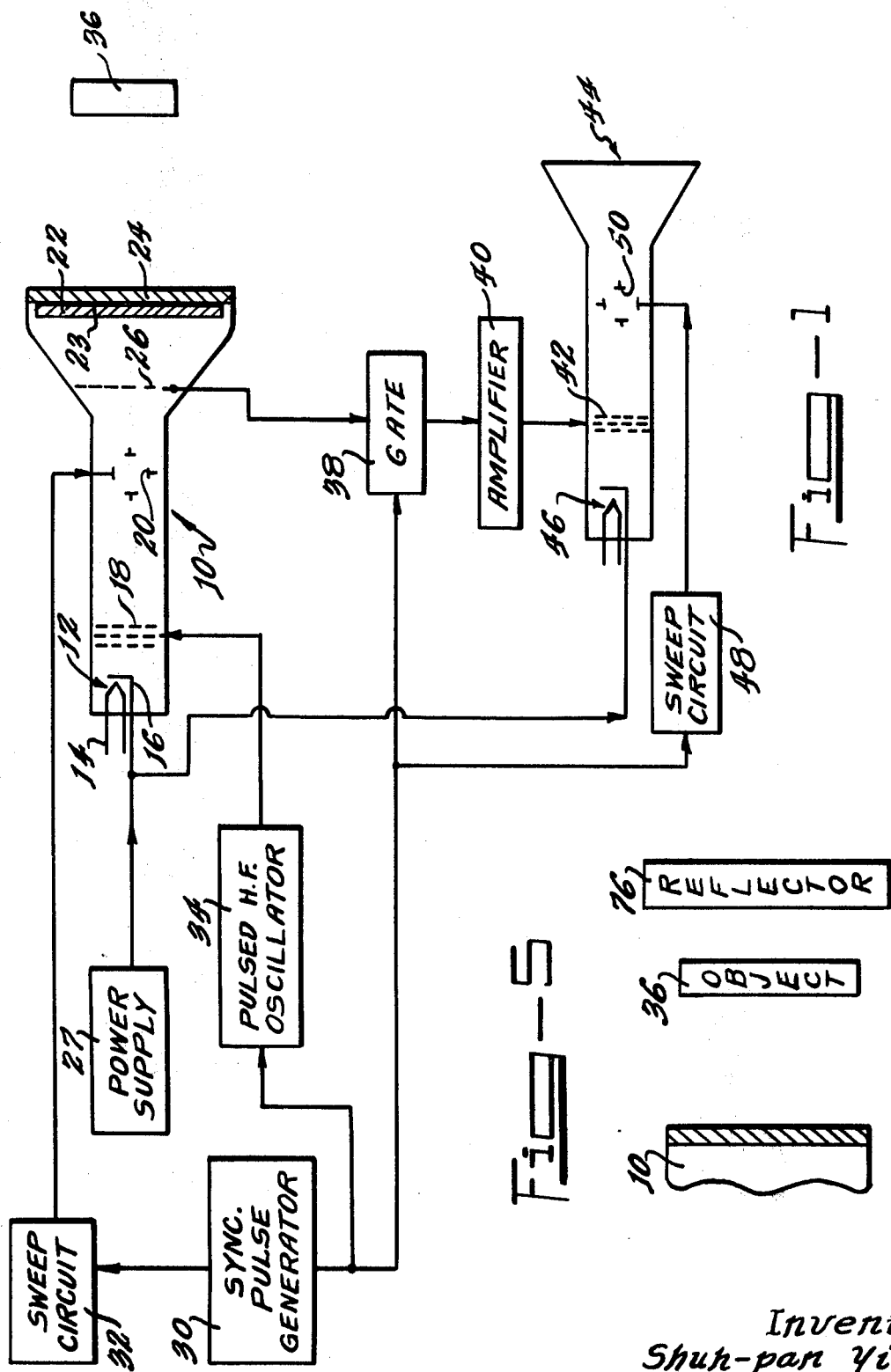
FIG. 1 is a schematic diagram of an apparatus constructed according to the present invention.

A power supply 27 drives the electron gun 12 to provide an electron beam which is transmitted to the piezoelectric plate 22. A pulse generator 30 provides a synchronizing pulse which is fed to a sweep circuit 32. The sweep circuit 32 provides a sawtooth waveform output which is applied to the deflection plates 20 to cause the electron beam from gun 12 to sweep across the piezoelectric plate 22 in a raster sweep. They synchronizing output pulse from pulse generator 30 is also fed to a pulsed high-frequency oscillator circuit 34. The output of the pulsed high-frequency oscillator 34 is fed to the grid 18 of the electron gun 12 where it modulates the electron beam applied to the piezoelectric plate 22 to cause ultrasound to be radiated from the plate 22. The ultrasound generated by the piezoelectric plate 22 is transmitted to the test object 36. Ultrasound reflected by the test object 36 returns to the piezoelectric plate 22 and establishes a charge having a distribution across the plate proportional to the energy of the ultrasound impinging thereon. The electron beam sweeping across the piezoelectric plate 22 releases from the plate 22 secondary electrons whose energies are proportional to the charge distribution created by the reflected ultrasound. These secondary electrons are detected by the collector electrode 26 and fed to an input of a gate circuit 38. The other input of gate circuit 38 is connected to the synchronizing pulse output of pulse generator 30. The output of gate circuit 38 is fed via a receiver-amplifier 40 to the control grid 42 of a cathode-ray tube 44. The electron gun 46 of cathode-ray tube 44 is driven from power supply 27. The synchronizing pulse output from pulse generator 30 is fed to a sweep circuit 48 whose output, a sawtooth waveform, drives the deflection plates 50 of cathode-ray tube 44.

In operation, the electron gun 12 generates an electron beam which is scanned by the voltage on deflector plates 20 across the interior side of the piezoelectric plate 22 in a raster scan. The pulsed output from oscillator 34 modulates this electron beam, whereby the electron beam for a finite time impinges electrons on the piezoelectric plate 22 at an energy level such that an electric field is produced across the piezoelectric plate 22 to generate therefrom pulsed ultrasound. This pulsed ultrasound is transmitted to the test object 36, whereupon the test object reflects a portion thereof. The reflected ultrasound returns to the piezoelectric plate 22 to establish a charge on the plate whose distribution across the plate is proportional to the energy of the reflected pulsed ultrasound impinging thereon. The continuous electron beam scanning the interior side of piezoelectric plate 22 releases from the plate 22 secondary electrons whose energies are proportional to the charge distribution created by the reflected pulsed ultrasound. These secondary electrons are collected by collector electrode 26 and transmitted to the gate circuit 38. The gate circuit 38 is triggered by the synchronizing pulse generator 30 so that only secondary electrons are transmitted therethrough which are created by the charge generated from the reflected ultrasound. The output of the gate circuit 38 modulates the intensity of the electron beam in cathode-ray tube 44 which is swept in a raster scan synchronously with the raster scan sweep of the electron beam in acoustic image transceiver tube 10. Thus, an acoustic image is electronically portrayed for the object 36.

Figure 2:
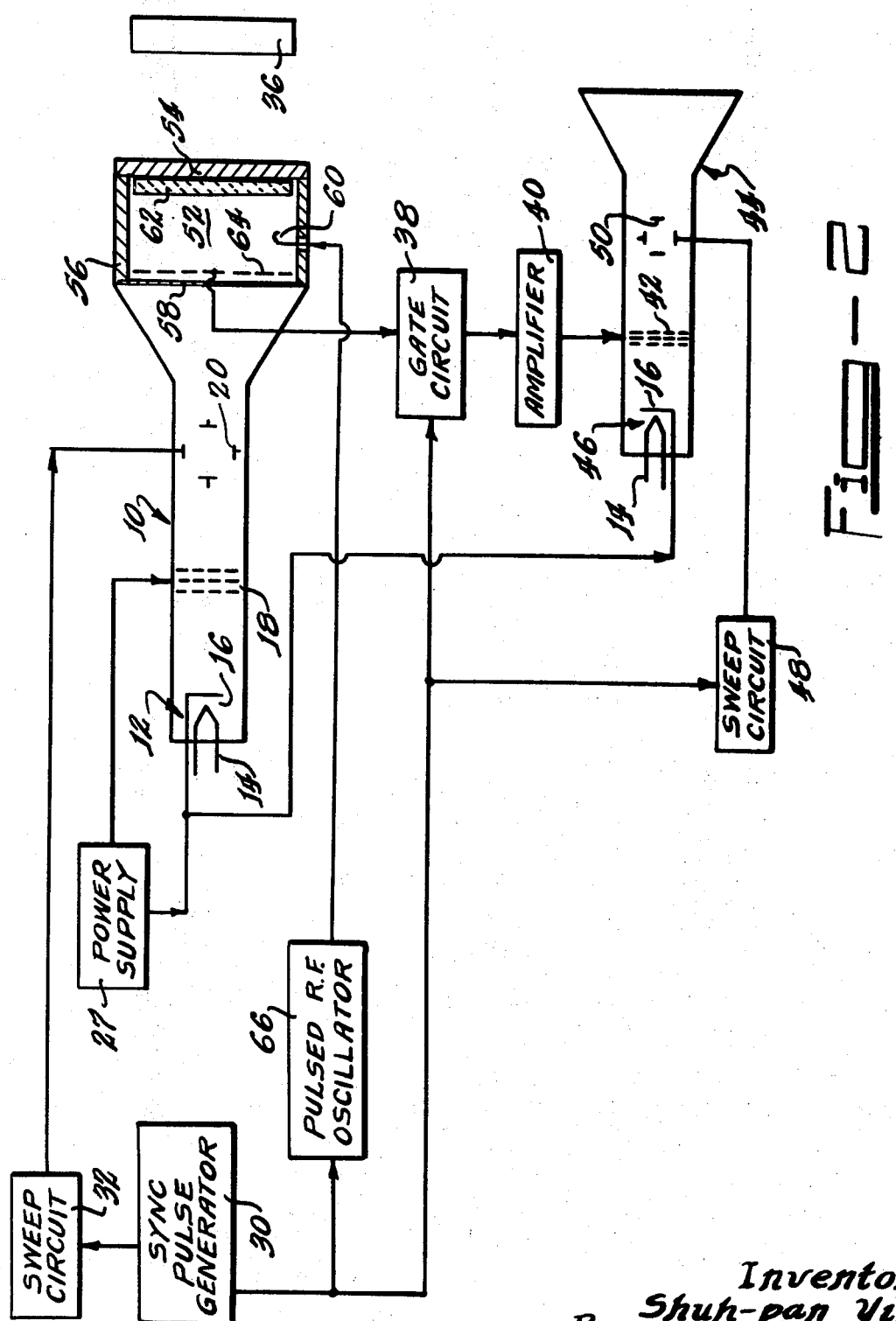
FIG. 2 is a schematic diagram of an alternate apparatus constructed according to the present invention.

Turning to FIG. 2, an alternate apparatus for the practice of the present invention is illustrated. Basically, the structure of the apparatus of FIG. 2 is similar to that of FIG. 1, differing primarily in the structure of the acoustic image transceiver tube 10. The acoustic image transceiver tube 10 is constructed so that the end potion thereof forms a resonant cavity 52. To form the cavity 52, the acoustic window 54 is constructed of metal, as is the envelope portion 56. To complete the cavity, a metal screen 58 is constructed within the interior of the tube 10. The envelope portion 56 has an aperture therethrough to permit the insertion of an RF probe 60 within the cavity. A piezoelectric plate 62 is acoustically coupled to the acoustic window 54 by an electrically insulating acoustic couplant such as silicone grease. A collector electrode 64 is mounted within the interior of the cavity 52 adjacent the metal screen 58. The RF probe 60 is driven by a pulsed RF oscillator 66 which, in turn, is driven by the synchronizing pulsed output from pulse generator 30.

In operation, the electron gun 12 of transceiver tube 10 in FIG. 2 generates an electron beam which is scanned by the voltage on deflector plates 20 across the interior side of the piezoelectric plate 22 in a raster scan. The synchronizing pulsed output from pulse generator 30 drives the RF pulsed oscillator 66 to produce an RF pulse which, via RF probe 60, excites the resonant cavity 52. The pulsed electromagnetic field generated within the excited cavity 52 imparts an electric field across the piezoelectric plate 62 to generate therefrom pulsed ultrasound. The generated pulsed ultrasound is transmitted to the test object 36 were a portion thereof is reflected back to the piezoelectric plate 62. The reflected ultrasound establishes a charge distribution across the piezoelectric plate 62 proportional to the energy of the reflected pulsed ultrasound impinging on the plate 62. The electron beam scanning the interior side of the piezoelectric plate 62 releases from the plate 62 secondary electrons whose energies are proportional to the distribution of the charge created by the reflected pulsed ultrasound. These secondary electrons are collected by collector electrode 64 and transmitted to the gate circuit 38. The gate circuit 38 is triggered by the synchronizing pulse generator 30 so that only secondary electrons are transmitted therethrough which are created by the charge distribution resulting from the reflected pulsed ultrasound. The output of the gate circuit 38 modulates the intensity of the electron beam in cathode-ray tube 44 which is swept in a raster scan synchronously with the raster scan sweep of the electron beam in acoustic image transceiver tube 10. Thus, as in the apparatus of FIG. 1, an acoustic image is electronically portrayed on the cathode-ray tube 44 for the test object 36.

DESCRIPTION OF THE PREFERRED EMBODIMENT

In FIG. 3 a preferred embodiment for the practice of the present invention is illustrated. As for the apparatus of FIG. 2, the apparatus of FIG. 3 is basically similar to the apparatus of FIG. 1, the difference therebetween being in the structure of the acoustic image transceiver tube 10. In FIG. 3, the acoustic image transceiver tube 10 is constructed so that a transmitting piezoelectric plate 68 is mounted adjacent the acoustic window 70 and a receiving piezoelectric plate 72 is mounted adjacent the transmitting piezoelectric plate 68. The transmitting piezoelectric plate is coated on both sides with thin metal films 74 and 75 of an electrically conductive material such as silver. An acoustic conductor 77 such as silicone grease is used to acoustically couple the piezoelectric plates 68 and 72 and the acoustic window 70. The end structure of the tube 10 is shown in magnified section in FIG. 4. The output of the pulsed high-frequency oscillator 34 is connected across the metal films 74 and 75, as shown, to establish a pulsed electric field across the transmitting piezoelectric plate 68.

In operation, the electron gun 12 of the acoustic image transceiver tube 10 generates for the embodiment of FIG. 3 an electron beam which is scanned by the voltage on deflector plates 20 across the interior side of the receiving piezoelectric plate 72 in a raster scan. The synchronizing pulsed output from pulse generator 30 drives high-frequency pulsed oscillator 34 whose output is applied to the metal films 74 and 75 to generate a pulsed electric field across the transmitting piezoelectric plate 68. The pulsed electric field across transmitting piezoelectric plate 68 causes the generation of pulsed ultrasound from the plate 68. This pulsed ultrasound is transmitted to the test object 36 wherefrom a portion is reflected. The reflected pulsed ultrasound from the test object 36 returns to establish a charge distribution across the receiving piezoelectric plate 72 proportional to the energy of the reflected pulsed ultrasound impinging thereon. The continuous electron beam scanning the interior side of piezoelectric plate 72 releases from the plate 72 secondary electrons whose energies are proportional to the distribution of the charge created by the reflected pulsed ultrasound. These secondary electrons are collected by collector electrode 26 and transmitted to the gate circuit 38. The gate circuit 38, as in FIG. 1, is triggered by the synchronizing pulsed generator 30 so that only secondary electrons are transmitted therethrough which are created by the charge generated from the reflected ultrasound. The output of the gate circuit 38 modulates the intensity of the beam in cathode-ray tube 44 which in a raster scan synchronously with the raster scan sweep of the electron beam in acoustic image transceiver tube 10. An acoustic image for the object 36 is thus displayed on cathode-ray tube 44.

For the embodiments of FIGS. 1, 2 and 3, conventional transducer materials such as lead zirconate-titanate and X-cut quartz may be used for the piezoelectric plates. It will be noted that in the embodiment of FIG. 3 the receiving signals were found to be much stronger when the transmitting and receiving piezoelectric plates 68 and 72 were of the same piezoelectric material. The imaging of a test object located less than 1 inch from the acoustic window of the image tube 10 may be accomplished using quartz piezoelectric plates with approximately the following signal values. For the embodiment of FIG. 1, a 5 msec. pulse modulates the electron beam with a 3 kv. signal to produce a 10 msec. pulse of ultrasound having a carrier frequency of 2 mc. For the embodiment of FIG. 2, a 1 msec. pulse excites the resonant cavity of the image tube 10 with a 10 kv. signal. The cavity is sized to resonate at 300 mc. and the excited piezoelectric plate produces a 3 msec. pulse of ultrasound having a 30 mc. carrier frequency. For the embodiment of FIG. 3, a 5 msec., 1 kv. pulse is applied across the transmitting piezoelectric plate to generate a 2 msec. pulse of ultrasound having a 2 mc. carrier frequency.

Where the test object to be portrayed does not reflect ultrasound, for the operation of the embodiments illustrated in FIGS. 1, 2 and 3, it is necessary that an ultrasound reflector plate 76 be mounted as shown in FIG. 5 behind the object 36 so that ultrasound transmitted from the acoustic image transceiver tube travels past the object to the reflector and back to the acoustic image transceiver tube. In this structure, the acoustic shadow of the test object is detected and portrayed on the cathode-ray tube 44.

Persons skilled in the art will, of course, readily adapt the general teachings of the invention to embodiments far different from the embodiments illustrated. Accordingly, the scope of the protection afforded the invention should not be limited to the particular embodiment illustrated in the drawings and described above, but should be determined only in accordance with the appended claims.

The embodiments of the invention in which an exclusive property or privilege is claimed are defined as follows:

1. An acoustic image converter for nondestructively testing an object comprising a first piezoelectric member, means for exciting said piezoelectric member to transmit therefrom pulsed ultrasound to said object, said object reflecting portion of said pulsed ultrasound to said piezoelectric member to create a charge distribution thereacross, and means for measuring the charge distribution of said piezoelectric member to provide an image of said object.

2. The apparatus of claim 1 wherein said piezoelectric-member-exciting means and charge-measuring means comprise means for generating a beam of electrons in a raster scan over a surface of said piezoelectric member to release secondary electrons therefrom responsive to the charge distribution thereon, a metal member mounted to a surface of said piezoelectric member opposite said scanned surface thereof, means for modulating said electron beam to transmit pulsed ultrasound from said piezoelectric member to said object, said object reflecting a portion of said pulsed ultrasound to said piezoelectric member to create said charge distribution thereon, a collector electrode mounted to detect said secondary electrons, and display means coupled to said collector electrode and synchronized with said electron beam scan to provide an image of said object.

3. The apparatus of claim 2 wherein said display means comprise a cathode-ray tube including an electron beam generator and electron beam deflection means, gating means responsive to said modulating means for coupling the output of said collector electrode to said cathode-ray tube electron beam generator to modulate the intensity of the electron beam thereof, and means for synchronizing said cathode-ray tube electron beam deflection means with the raster scan of said electron beam over a surface of said piezoelectric member.

4. The apparatus of claim 1 wherein said piezoelectric-member-exciting means and charge-measuring means comprise a resonant cavity disposed about said piezoelectric member, radiofrequency pulse-generating means coupled to said resonant cavity to generate therein pulsed electromagnetic energy wherefrom said piezoelectric member is excited to transmit ultrasound to said object, said object reflecting a portion of said pulsed ultrasound to said piezoelectric member to create a charge distribution thereacross, means for generating a beam of electrons in a raster scan over a surface of said piezoelectric member to release secondary electrons therefrom responsive to the charge distribution thereon, a collector electrode mounted to detect said secondary electrons, and display means coupled to said collector electrode and synchronized with said electron beam scan to provide an image of said object.

5. The apparatus according to claim 4 wherein said display means comprise a cathode-ray tube including an electron beam generator and an electron beam deflection means, gating means responsive to said radiofrequency pulse-generating means for coupling the output of said collector electrode to said cathode-ray tube electron beam generator to modulate the intensity of the electron beam thereof, and means for synchronizing said cathode-ray tube electron beam deflection means with the raster scan of said electron beam over a surface of said piezoelectric member.

6. The apparatus of claim 1 further including a second piezoelectric member and wherein said first piezoelectric-member-exciting and charge-measuring means comprise a pair of metal members each mounted to an associated surface of said first piezoelectric member, means for acoustically coupling said piezoelectric members and said metal members, pulse-generating means coupled to said metal members to create a pulsed electric field across said first piezoelectric member and transmit pulsed ultrasound therefrom to said object, said object reflecting a portion of said pulsed ultrasound to said second piezoelectric member to create a charge distribution thereon, means for generating a beam of electrons in a raster scan over a surface of said second piezoelectric member to release secondary electrons therefrom responsive to the charge distribution thereon, a collector electrode mounted to detect said secondary electrons, and display means coupled to said collector electrode and synchronized with said electron beam scan to provide an image of said object.

7. The apparatus of claim 6 wherein said first and second piezoelectric members are of the same material.

8. The apparatus of claim 7 wherein said display means comprise a cathode-ray tube including an electric beam generator and electron beam deflection means, gating means responsive to said pulse-generating means for coupling the output of said collector electrode to said cathode-ray tube electron beam generator to modulate the intensity of the electron beam thereof, and means for synchronizing said cathode-ray tube electron beam deflection means with the raster scan of said electron beam over a surface of said second piezoelectric member.

9. An acoustic image converter for nondestructively testing an object comprising an acoustic image tube including a piezoelectric member and means for generating and deflecting an electron beam over a surface of said piezoelectric member, means for exciting said piezoelectric member to transmit pulsed ultrasound therefrom to said object; means including said object for reflecting a portion of said pulsed ultrasound to said piezoelectric member to create a charge distribution thereon, said electron beam releasing secondary electrons from said piezoelectric member responsive to said charge distribution thereon, and means for detecting said secondary electrons to provide an image of said object.

10. The apparatus of claim 9 wherein said piezoelectric-member-exciting means comprise a metal member mounted to a surface of said piezoelectric member, and means for pulse modulating said electron beam to produce a pulsed electric field across said piezoelectric member to generate pulsed ultrasound therefrom.

11. The apparatus of claim 9 wherein said piezoelectric-member-exciting means comprise a resonant cavity formed about said piezoelectric member, and means for exciting said cavity to establish a pulsed electric field across said piezoelectric member to generate pulsed ultrasound therefrom.

12. The apparatus of claim 9 wherein said piezoelectric-member-exciting means comprise a pair of metal members mounted on opposing surfaces of said piezoelectric member, and means for generating and applying a pulsed voltage to said metal members to generate a pulsed electric field across said piezoelectric member to generate pulsed ultrasound therefrom, and further including a second piezoelectric member mounted to receive said reflected pulsed ultrasound to create a charge distribution thereon, said electron beam being deflected over a surface of said second piezoelectric member to produce secondary electrons responsive to said charge distribution thereon, and said detecting means detect said secondary electrons from said second piezoelectric member to produce an image of said object.